United States Patent
Hjärtfors et al.

(10) Patent No.: US 11,685,825 B2
(45) Date of Patent: Jun. 27, 2023

(54) CABLE JACKET COMPOSITION

(71) Applicant: Borealis AG, Vienna (AT)

(72) Inventors: Anna Hjärtfors, Kungälv (SE); Yi Liu, Engerwitzdorf (AT); Joseph Thorman, Helsinki (FI); Victor Sumerin, Helsinki (FI)

(73) Assignee: Borealis AG, Vienna (AT)

(*) Notice: Subject to any disclaimer, the term of this patent is extended or adjusted under 35 U.S.C. 154(b) by 0 days.

(21) Appl. No.: 16/499,352

(22) PCT Filed: Apr. 6, 2018

(86) PCT No.: PCT/EP2018/058836
§ 371 (c)(1),
(2) Date: Sep. 30, 2019

(87) PCT Pub. No.: WO2018/185273
PCT Pub. Date: Oct. 11, 2018

(65) Prior Publication Data
US 2021/0095108 A1 Apr. 1, 2021

(30) Foreign Application Priority Data

Apr. 6, 2017 (EP) ..................................... 17165256

(51) Int. Cl.
*C08F 210/16* (2006.01)
*C08L 23/08* (2006.01)
*G02B 6/44* (2006.01)
*H01B 3/44* (2006.01)

(52) U.S. Cl.
CPC ........ *C08L 23/0815* (2013.01); *C08F 210/16* (2013.01); *G02B 6/443* (2013.01); *H01B 3/441* (2013.01); *C08L 2310/00* (2013.01)

(58) Field of Classification Search
CPC .......... C08L 23/04; C08L 23/06; C08L 23/08; C08L 2205/02; C08L 2203/202; C08F 10/02; C08F 210/08; H01B 3/441
See application file for complete search history.

(56) References Cited

U.S. PATENT DOCUMENTS

| | | |
|---|---|---|
| 6,329,054 B1 | 12/2001 | Rogestedt et al. |
| 6,569,948 B2 | 5/2003 | Laurent |
| 8,791,205 B2 | 7/2014 | Michie, Jr. et al. |
| 2006/0241256 A1 | 10/2006 | Baann et al. |
| 2015/0315316 A1* | 11/2015 | Jayaratne ............... C08F 210/16 502/154 |

FOREIGN PATENT DOCUMENTS

| | | |
|---|---|---|
| EP | 2889323 A1 | 7/2015 |
| WO | WO 2013/146944 A1 | 10/2013 |
| WO | WO 2016/097193 A1 | 6/2016 |

OTHER PUBLICATIONS

Huang J. C-K et al., "Effects of Hydrogen and 1-Butene Concentrations on the Molecular Properties of Polyethylene Produced by Catalytic Gas-Phase Polymerization", Industrial & Engineering Chemistry Research, American Chemical Society, US, vol. 36, No. 4, Jan. 1, 1997, pp. 1136-1143.
International Search Report for PCT/EP2018/058836, dated May 4, 2018.

* cited by examiner

*Primary Examiner* — Irina S Zemel
*Assistant Examiner* — Jeffrey S Lenihan
(74) *Attorney, Agent, or Firm* — Lippes Mathias LLP

(57) ABSTRACT

The present invention relates to a cable jacket composition comprising a multimodal olefin copolymer, said copolymer having density of 0.935-0.960 g/cm$^3$ and MFR$_2$ of 2.2-10.0 g/10 min and said composition having ESCR of at least 2000 hours and a cable shrinkage of 0.70% or lower. The invention further relates to the process for preparing said composition and its use as outer jacket layer for a cable, preferably a communication cable, most preferably a fiber optic cable.

17 Claims, No Drawings

CABLE JACKET COMPOSITION

This is a 371 of PCT/EP2018/058836, filed Apr. 6, 2018, which claims priority to European Patent Application Serial No. 17165256.3, filed Apr. 6, 2017, the contents of which are incorporated herein in their entirety.

FIELD OF THE INVENTION

The present invention relates to a cable jacket composition, to the process for preparing said composition and its use as outer jacket layer for a cable, preferably a communication cable.

BACKGROUND OF THE INVENTION

Cables, which include power cables for high, medium or low voltage, and communication cables, such as fiber-optic, coaxial and twisted pair cables, generally comprise a core surrounded by a sheath consisting of one or more layers.

The outermost layer is often referred to as jacket or jacketing layer and is nowadays made of polymer material, preferably ethylene copolymer. The jacket material has to meet a number of properties requirements, which may vary depending on the intended application.

Important properties of cable jacketing compositions are good processability, i.e. it should be easy to process the material within a broad temperature range, low shrinkage, high mechanical strength, high surface finish as well as high environmental stress cracking resistance (ESCR). Often, however, good properties in one respect are obtained at the cost of poorer properties in some other respects.

Fiber optic cable (FOC) functionality is especially sensitive to shrinkage. As smaller and smaller constructions are sought, the requirements for shrinkage become even more stringent.

A current high density FOC sold on the market is Borstar® HE6067, which is a bimodal high density polyethylene jacketing composition known for its low shrinkage and good mechanical properties. However there is still a need to decrease the shrinkage further and improve processability while maintaining reasonable hardness and ESCR.

SUMMARY OF THE INVENTION

The present invention provides a cable jacket composition comprising a multimodal olefin copolymer, wherein the copolymer has density of 0.935-0.960 g/cm$^3$ and MFR$_2$ of 2.2-10.0 g/10 min, and the composition has ESCR of at least 2000 hours and cable shrinkage of 0.70% or lower.

Preferably, the multimodal olefin copolymer has MFR$_2$ of 2.5-8.0 g/10 min.

Preferably, the multimodal olefin copolymer has Mw of 55000-95000.

The composition preferably has a cable extrusion pressure of 144 bar or lower.

Further, the composition preferably has Eta 300 of 500 Pa·s or lower.

The multimodal olefin copolymer in the composition is preferably a bimodal polymer mixture of a low molecular weight ethylene homo- or copolymer and a high molecular weight copolymer of ethylene and a comonomer selected from the list consisting of 1-butene, 4-methyl-1-pentene, 1-hexene and 1-octene. More conveniently, the multimodal olefin copolymer mixture is a bimodal polymer mixture of a low molecular weight ethylene homopolymer and a high molecular weight copolymer of ethylene and 1-butene.

According to one embodiment, the composition may further comprise a conductive filler in an amount from 0.05 to 5 wt %, preferably from 0.05 to 3 wt % of the entire composition. Conveniently the conductive filler is carbon black.

According to another embodiment, the composition essentially consists of the multimodal olefin copolymer.

The invention is also directed to a cable comprising the composition as described in the variants above, said cable having shrinkage of 0.70% or lower.

Preferably said cable is a fiber-optic cable.

The invention further pertains to a process for preparing the cable jacket composition as described above, wherein the polymerization of the multimodal olefin copolymer comprises two main polymerization stages in the presence of a MgCl$_2$ supported catalyst prepared according to a method comprising the steps of: a) providing solid carrier particles of MgCl$_2$*m OH adduct; b) pre-treating the solid carrier particles of step a) with a compound of Group 13 metal; c) treating the pre-treated solid carried particles of step b) with a transition metal compound of Group 4 to 6; d) recovering the solid catalyst component; wherein the solid carrier particles are contacted with an internal organic compound of formula (I) or isomers or mixtures therefrom before treating the solid carrier particles in step c)

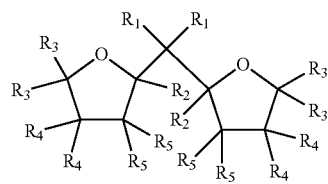

Formula (I)

and wherein in the formula (I), R$_1$ to R$_5$ are the same or different and can be hydrogen, a linear or branched C$_1$ to C$_8$-alkyl group, or a C$_3$-C$_8$-alkylene group, or two or more of R$_1$ to R$_5$ can form a ring, the two oxygen-containing rings are individually saturated or partially unsaturated or unsaturated, and R in the adduct MgCl$_2$*mROH is a linear or branched alkyl group with 1 to 12 C atoms, and m is 0 to 6.

Preferably the two main polymerization stages are a combination of loop reactor/gas phase reactor or gas phase reactor/gas phase reactor. The process may further include a pre-polymerization stage.

The invention is also directed to the use of the MgCl$_2$ supported catalyst prepared according to the method described above (also described in WO2016097193), in the preparation of the cable jacket composition as described in the above variants.

DETAILED DESCRIPTION OF THE INVENTION

The present invention provides a cable jacket composition comprising a multimodal olefin copolymer, wherein the copolymer has density of 0.935-0.960 g/cm$^3$ and MFR$_2$ of 2.2-10.0 g/10 min, and the composition has ESCR of at least 2000 hours and cable shrinkage of 0.70% or lower.

Preferably, the multimodal olefin copolymer has MFR$_2$ of 2.5-8.0 g/10 min. The density is preferably of 0.935-0.950 g/cm$^3$.

Further, the multimodal olefin copolymer of the invention preferably has MFR$_5$ higher than 8.0, preferably 9.0 g/10 min, usually between 8.0, preferably 9.0 and 25.0 g/10 min.

Still further, the multimodal olefin copolymer preferably has Mw of 55000-95000, or of 65000-91000. Preferably the multimodal olefin copolymer has Mn of 6500-11000 or 7000-10500. Further, the multimodal olefin copolymer preferably has MWD of 7-12.

Preferably, the multimodal olefin copolymer of the invention, which has a density of 0.935-0.960 g/cm$^3$ and MFR$_2$ of 2.2-10.0 g/10 min, has MFR$_5$ of 8.0-25.0 g/10 min, Mw of 55000-95000, Mn of 6500-11000 and MWD of 7-12.

Even more preferably, the multimodal olefin copolymer of the invention, which has a density of 0.935-0.960 g/cm$^3$ and MFR$_2$ of 2.5-8.0 g/10 min, has MFR$_5$ of 9.0-25.0 g/10 min, Mw of 65000-91000, Mn of 7000-10500 and MWD of 7-12.

The multimodal olefin copolymer in the composition of the invention is preferably a bimodal polymer mixture of a low molecular weight homo- or copolymer, preferably a homopolymer, and a high molecular weight copolymer; wherein the low molecular weight ethylene homopolymer has lower molecular weight than the high molecular weight copolymer.

Preferably the low molecular weight homo- or copolymer is an ethylene homo- or copolymer, preferably an ethylene homopolymer and the high molecular weight copolymer is a copolymer of ethylene and a comonomer.

Commonly used comonomers are olefins having up to 12 carbon atoms, such as α-olefins having 3-12 carbon atoms, e.g. propene, butene, 4-methyl 1-pentene, hexene, octene, decene, etc., According to the present invention, the comonomer is selected from the list consisting of 1-butene, 4-methyl-1-pentene, 1-hexene and 1-octene.

More conveniently, the multimodal olefin copolymer of the invention is a bimodal polymer mixture of a low molecular weight ethylene homopolymer and a high molecular weight copolymer of ethylene and 1-butene.

If a polymer consists of only one kind of monomers then it is called a homopolymer, while a polymer which consists of more than one kind of monomers is called a copolymer. However according to the invention the term homopolymer encompasses polymers that mainly consist of one kind of monomer but may further contain comonomers in an amounts of 0.09 mol % or lower.

According to the invention, the low molecular weight homo- or copolymer has preferably a density from 0.930-0.975 g/cm$^3$ and a MFR$_2$ of 25-1000 g/10 min, preferably, preferably of 40-400 g/10 min and the high molecular weight copolymer has a density from 0.880-0.930 g/cm$^3$ and a MFR$_2$ of 0.02-1.0 g/10 min, preferably between 0.1 and 0.8 g/10 min.

Preferably, the multimodal olefin copolymer of the invention, which has a density of 0.935-0.960 g/cm$^3$ and MFR$_2$ of 2.2-10 g/10 min, has MFR$_5$ of 8.0-25.0 g/10 min, Mw of 55000-95000, Mn of 6500-11000 and MWD of 7-12; and the olefin copolymer is a bimodal polymer mixture of a low molecular weight homo- or copolymer, preferably a homopolymer, and a high molecular weight copolymer wherein the low molecular weight homo- or copolymer has a density from 0.930-0.975 g/cm$^3$ and a MFR$_2$ from 25-1000 g/10 min, preferably of 40-400 g/10 min and the high molecular weight copolymer has a density from 0.880-0.930 g/cm$^3$ and a MFR$_2$ of 0.02-1.0 g/10 min.

It is well known to a person skilled in the art how to produce multimodal, in particular bimodal olefin polymers, or multimodal ethylene polymers, in two or more reactors, preferably connected in series. Each and every one of the polymerization stages can be carried out in liquid phase, slurry or gas phase.

In the production of, say, a bimodal homo- or copolymer, usually a first polymer is produced in a first reactor under certain conditions with respect to monomer composition, hydrogen-gas pressure, temperature, pressure, and so forth. After the polymerization in the first reactor, the reaction mixture including the polymer produced is fed to a second reactor, where further polymerization takes place under other conditions.

Usually, a first polymer of high melt flow rate (low molecular weight) and with a moderate or small addition of comonomer, or no such addition at all, is produced in the first reactor, whereas a second polymer of low melt flow rate (high molecular weight) and with a greater addition of comonomer is produced in the second reactor. The order of these stages may, however, be reversed. Further, an additional reactor may be used to produce either the low molecular weight or the high molecular weight polymer or both.

According to the present invention, the main polymerization stages are preferably carried out as a combination of slurry polymerization/gas-phase polymerization or gas-phase polymerization/gas-phase polymerization. The slurry polymerization is preferably performed in a so called loop reactor.

The composition is preferably produced in two or three main polymerization stages in a combination of loop and gas-phase reactors. It is especially preferred that the composition is produced in three main polymerization stages, in which case the first two stages are performed as slurry polymerization in loop reactors wherein a homopolymer is produced and the third stage is performed as gas-phase polymerization in a gas-phase reactor wherein a copolymer is produced.

The main polymerization stages may be preceded by a pre-polymerization, which may serve to polymerize a small amount of polymer onto the catalyst at a low temperature and/or a low monomer concentration. By prepolymerisation it is possible to improve the performance of the catalyst in slurry and/or modify the properties of the final polymer.

The polymerization in several successive polymerization reactors is preferably done with the aid of a catalyst as described in WO2016/097193.

The catalyst is a MgCl$_2$ supported catalyst prepared according to a method comprising the steps of a) providing solid carrier particles of MgCl$_2$*m OH adduct; b) pre-treating the solid carrier particles of step a) with a compound of Group 13 metal; c) treating the pre-treated solid carried particles of step b) with a transition metal compound of Group 4 to 6; d) recovering the solid catalyst component; wherein the solid carrier particles are contacted with an internal organic compound of formula (I) or isomers or mixtures therefrom before treating the solid carrier particles in step c) and wherein in the formula (I), R$_1$ to R$_5$ are the same or different and can be hydrogen, a linear or branched C$_1$ to C$_8$-alkyl group, or a C$_3$-C$_8$-alkylene group, or two or more of R$_1$ to R$_5$ can form a ring, the two oxygen-containing rings are individually saturated or partially unsaturated or unsaturated, and R in the adduct MgCl$_2$*mROH is a linear or branched alkyl group with 1 to 12 C atoms, and m is 0 to 6.

Magnesium dihalide is normally used as a starting material for producing a carrier. The solid carrier used in this invention is a carrier where alcohol is coordinated with Mg dihalide, preferably MgCl$_2$. The MgCl$_2$ is mixed with an alcohol (ROH) and the solid carrier MgCl$_2$*mROH is formed according to the well know methods. Spherical and granular MgCl$_2$*mROH carrier materials are suitable to be used in the present invention. The alcohol is preferably ethanol. In $MgCl_2 \cdot mROH$, m is 0 to 6, more preferably 1 to 4, especially 2.7 to 3.3.

$MgCl_2 \cdot mROH$ is available from commercial sources or can be prepared by methods described known in the art. The solid carrier particles of the invention may consist of $MgCl_2 \cdot mROH$.

Group 13 metal compound, used in step b) is preferably an aluminum compound. Preferred aluminum compounds are dialkyl aluminum chlorides or trialkyl aluminum compounds, for example dimethyl aluminum chloride, diethyl aluminum chloride, di-isobutyl aluminum chloride, and triethylaluminum or mixtures therefrom. Most preferably the aluminum compound is a trialkyl aluminum compound, especially triethylaluminum compound.

The transition metal compound of Group 4 to 6 is preferably a Group 4 transition metal compound or a vanadium compound and is more preferably a titanium compound. Particularly preferably the titanium compound is a halogen-containing titanium compound. Suitable titanium compounds include trialkoxy titanium monochlorides, dialkoxy titanium dichloride, alkoxy titanium trichloride and titanium tetrachloride. Preferably titanium tetrachloride is used.

In formula (I), examples of preferred linear or branched $C_1$ to $C_8$-alkyl groups are methyl, ethyl, n-propyl, i-propyl, n-butyl, sec-butyl, tert-butyl, pentyl and hexyl groups. Examples for preferred $C_3$-$C_8$-alkylene groups are pentylene and butylene groups. The two $R_1$ are preferably the same and are a linear $C_1$ to $C_4$-alkyl groups, more preferably methyl or ethyl. $R_2$ to $R_5$ are the same or different and are preferably H or a $C_1$ to $C_2$-alkyl groups, or two or more of $R_2$ to $R_5$ residues can form a ring. Most preferably $R_2$ to $R_5$ are all H.

Furthermore both oxygen-containing rings are preferably saturated or partially unsaturated or unsaturated. More preferably both oxygen-containing rings are saturated. Examples of preferred internal organic compounds are 2,2-di(2-tetrahydrofuryl)propane, 2,2-di(2-furan)propane, and isomers or mixtures thereof. Most preferably, 2,2-di(2-tetrahydrofuryl) propane (DTHFP) is used with the isomers thereof. DTHFP is typically a 1:1 mol/mol diastereomeric mixture of D,L-(rac)-DTHFP and meso-DTHFP.

The molar ratio of the internal organic compound of formula (I)/the adduct $MgCl2\langle*\rangle mROH$ added to the catalyst mixture is in the range of 0.02 to 0.20 mol/mol, preferably 0.05 to 0.15 mol/mol.

The Al compound can be added to the solid carrier before or after adding the internal organic compound or simultaneously with the internal organic compound to the carrier. Most preferably in any case, m is 2.7 to 3.3, ROH is ethanol, aluminum compound is an aluminum trialkyl compound, such as triethylaluminum, and as internal donor is used 2,2-di(2-tetrahydrofuryl)propane, or 2,2-di-(2-furan)propane, especially 2,2-di(2-tetrahydrofuryl)propane or isomers or mixtures thereof.

The final solid catalyst component shall have Mg/Ti mol/mol ratio of 1 to 10, preferably 2 to 8, especially 3 to 7, Al/Ti mol/mol ratio 0.01 to 1, preferably 0.1 to 0.5 and Cl/Ti mol/mol ratio of 5 to 20, preferably 10 to 17.

The resulting end product consists of an intimate mixture of the polymers from the reactors, the different molecular weight distribution curves of these polymers together forming a molecular weight distribution curve having a broad maximum or two maxima, i.e. the end product is a bimodal polymer mixture.

According to the invention, it is preferred that the amount of olefin polymer having a high melt flow rate (low-molecular weight) makes up at least 30% by weight but no more than 65% by weight of the total polymer, preferably 35-62% by weight of the total polymer. Preferably, the amount of olefin polymer having a low melt flow rate (high-molecular weight) makes up at least 35% by weight but no more than 70% by weight of the total polymer, preferably 38-65% by weight of the total polymer.

According to one embodiment, the composition may further comprise a conductive filler in an amount up to 5 wt % preferably up to 3 wt % of the entire composition. The filler is conveniently carbon black. Preferably the carbon black is added to the composition in a master-batch on a polymer carrier.

According to another embodiment, the composition essentially consists of the multimodal olefin copolymer.

Small amounts of antioxidants and/or acid scavengers may be present in both the above mentioned embodiments, preferably, in total, from 0.01 to 1 wt % of the entire composition.

Suitable antioxidants may be N,N'-bis(3(3',5'-di-t-butyl-4'-hydroxyphenyl)propionyl)hydrazine and 4,4'-thiobis(2-t-butyl-5-methylphenol). Preferred antioxidants are pentaerythrityl-tetrakis(3-(3',5'-di-t butyl-4-hydroxyphenyl) propionate and tris(2,4-di-t-butylphenyl)phosphate.

Suitable acid scavengers are the ones well known to a person skilled in the art. A preferred acid scavenger is calcium stearate.

The cable jacket composition of the invention has an ESCR of at least 2000 hours and cable shrinkage of 0.70% or lower, preferably 0.60% or lower. The shrinkage is usually of 0.40-0.70% or preferably 0.40-0.60%.

The composition preferably has cable extrusion pressure of 144 bar or lower, usually between 100 and 144 bar.

The composition preferably has Eta 300 of 500 Pa·s or lower, usually between 500 and 250 Pa·s, preferably between 480 and 300 Pa·s.

Preferably the cable jacket composition has ESCR of at least 5000 hours. The ESCR of the composition may have an upper limit of 20000 hours.

Preferably, the cable jacket composition of the invention comprises a multimodal olefin copolymer, which has a density of 0.935-0.960 g/cm$^3$ and MFR$_2$ of 2.2-10 g/10 min, and cable shrinkage of 0.40-0.70%, preferably 0.40-0.60%. Preferably the composition also has Eta 300 of 250-500 Pa·s and/or cable extrusion pressure of 100-144 bar.

Even more preferably, the cable jacket composition of the invention comprises a multimodal olefin copolymer, which has a density of 0.935-0.960 g/cm$^3$ and MFR$_2$ of 2.5-8 g/10 min, and cable shrinkage of 0.40-0.70%, preferably 0.40-0.60%. Preferably the composition also has Eta 300 of 250-500 Pa·s and/or cable extrusion pressure of 100-144 bar.

The use of multimodal olefin polymer mixtures of the type described above results in inventive cable jacket compositions having superior properties than conventional cable jacket compositions, especially as regards shrinkage, ESCR and processability. In particular, the reduced shrinkage of the inventive cable jacket composition in combination with the excellent ESCR and processability properties is a great advantage.

The cable jacket composition according to the invention may be used for producing outer sheaths for cables, including power cables as well as communication cables. Amongst power cables, whose outer sheaths may advantageously be produced from the cable jacket composition according to the invention, mention may be made of high-voltage cables, medium-voltage cables and low-voltage cables.

The invention is also directed to a cable comprising the composition as described in the variants above, said cable having cable shrinkage of 0.40-0.60%.

Amongst communication cables, whose outer sheaths may advantageously be made from the cable jacket composition according to the invention, mention may be made to twisted pair cables, coaxial cables and optical cables, preferably fiber optic cables.

Test Methods
MFR

The MFR of a polymer is determined in accordance with ISO 1133-1 at 190° C. The load under which the measurement is conducted is given as a subscript. Thus, the MFR under the load of 2.16 kg is denoted as $MFR_2$. The melt flow rate $MFR_{21}$ is correspondingly determined at 190° C. under a load of 21.6 kg and $MFR_5$ under a load of 5 kg. The melt flow rate, which is indicated in g/10 min, is an indication of the flowability, and hence the processability, of the polymer. The higher the melt flow rate, the lower the viscosity of the polymer.

It should here be pointed out that, in the production of two or more polymer components in reactors connected in series, it is only in the case of the component produced in the first reactor stage and in the case of the end product that the melt flow rate, the density and the other properties can be measured directly on the material removed. The corresponding properties of the polymer components produced in reactor stages following the first stage can only be indirectly determined on the basis of the corresponding values of the materials introduced into and discharged from the respective reactor stages. The $MFR_2$ of the low molecular component is the one measured on the component produced in the first loop reactor stage even when a pre-polymerization stage is present. In particular, with reference to the examples, A21 $MFR_2$ is the $MFR_2$ of A1+A21 polymer blend; A2 $MFR_2$ is the $MFR_2$ of A1+A21+A2 polymer blend.

The composition $MFR_2$ is measured on the pellets obtained as described in the below "Compounding" paragraph.

Density

Density of the polymer is measured according to ISO 1183-1:2004 Method A on compression moulded specimen prepared according to EN ISO 1872-2 (February 2007) and is given in $kg/m^3$.

ESCR

By the term ESCR (environmental stress cracking resistance) is meant the resistance of the polymer to crack formation under the action of mechanical stress and a reagent in the form of a surfactant. The ESCR is determined in accordance with IEC 60811-406, method B. The reagent employed is 10 weight % Igepal CO 630 in water. The materials were prepared according to instructions for HDPE as follows: The materials were pressed at 165° C. to a thickness of 1.75-2.00 mm. The notch was 0.30-0.40 mm deep.

Eta300

The characterization of polymer melts by dynamic shear measurements complies with ISO standards 6721-1 and 6721-10. The measurements are performed on an Anton Paar MCR501 stress controlled rotational rheometer, equipped with 25 mm parallel plate geometry. Measurements are undertaken on compression molded plates, using nitrogen atmosphere and setting a strain within the linear viscoelastic regime. The oscillatory shear tests are done at a temperature of 190° C. applying a frequency range between 0.01 and 628 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \quad (1)$$

If the applied strain is within the linear viscoelastic regime, the resulting sinusoidal stress response can be given by $$\sigma(t) = \sigma_0 \sin(\omega t + \delta) \quad (2)$$

where
$\sigma_0$ and $\gamma_0$ are the stress and strain amplitudes, respectively,
$\omega$ is the angular frequency,
$\delta$ is the phase shift (loss angle between applied strain and stress response),
t is the time.

Dynamic test results are typically expressed by means of several different rheological functions, namely the shear storage modulus G', the shear loss modulus, G", the complex shear modulus, G*, the complex shear viscosity, η*, the dynamic shear viscosity, η', the out-of-phase component of the complex shear viscosity η" and the loss tangent, tan δ which can be expressed as follows:

$$G' = \frac{\sigma_0}{\gamma_0} \cos\delta \text{ [Pa]} \quad (3)$$

$$G'' = \frac{\sigma_0}{\gamma_0} \sin\delta \text{ [Pa]} \quad (4)$$

$$G^* = G' + iG'' \text{ [Pa]} \quad (5)$$

$$\eta^* = \eta' - i\eta'' \text{ [Pa.s]} \quad (6)$$

$$\eta' = \frac{G''}{\omega} \text{ [Pa.s]} \quad (7)$$

$$\eta'' = \frac{G'}{\omega} \text{ [Pa.s]} \quad (8)$$

The values of storage modulus (G'), loss modulus (G"), complex modulus (G*) and complex viscosity (η*) are obtained as a function of frequency (ω). Thereby, e.g. Eta0.05 is used as abbreviation for the complex viscosity at the frequency of 0.05 rad/s or Eta300 is used as abbreviation for the complex viscosity at the frequency of 300 rad/s.

Filler Content

The amount of carbon black is measured through combustion of the material in a tube furnace in nitrogen atmosphere. The sample is weighted before and after the combustion. The combustion temperature is 550° C. The method is according to ASTM D1603.

Comonomer Content

Quantitative nuclear-magnetic resonance (NMR) spectroscopy is used to quantify the comonomer content of the polymers.

Quantitative $^{13}C\{^1H\}$ NMR spectra are recorded in the molten-state using a Bruker Advance III 500 NMR spectrometer operating at 500.13 and 125.76 MHz for $^1H$ and $^{13}C$ respectively. All spectra are recorded using a $^{13}C$ optimized 7 mm magic-angle spinning (MAS) probe-head at 150° C. using nitrogen gas for all pneumatics. Approximately 200 mg of material is packed into a 7 mm outer diameter zirconia MAS rotor and spun at 4 kHz. This setup is chosen primarily for the high sensitivity needed for rapid identification and accurate quantification (Klimke et al, Macromol. Chem. Phys. 2006; 207:382; Parkinson et al, Macromol. Chem. Phys. 2007; 208:2128; Castignolles et al, M., Polymer 50 (2009) 2373).

Standard single-pulse excitation is employed utilizing the transient NOE at short recycle delays of 3 s (Pollard et al, Macromolecules 2004; 37:813; Klimke et al, Macromol. Chem. Phys. 2006; 207:382) and the RS-HEPT decoupling scheme (Filip et al, J. Mag. Resn. 2005, 176, 239; Griffin et al, Mag. Res. in Chem. 2007 45, S1, S198). A total of 1024 (1 k) transients are acquired per spectrum. This setup is chosen due its high sensitivity towards low comonomer contents.

Quantitative $^{13}C\{^{1}H\}$ NMR spectra are processed, integrated and quantitative properties determined using custom spectral analysis automation programs. All chemical shifts are internally referenced to the bulk methylene signal (δ+) at 30.00 ppm (J. Randall, Macromol. Sci., Rev. Macromol. Chem. Phys. 1989, C29, 201).

Characteristic signals corresponding to the incorporation of 1-butene are observed (J. Randall, Macromol. Sci., Rev. Macromol. Chem. Phys. 1989, C29, 201) and all contents calculated with respect to all other monomers present in the polymer.

Characteristic signals resulting from isolated 1-butene incorporation i.e. EEBEE comonomer sequences, are observed. Isolated 1-butene incorporation is quantified using the integral of the signal at 39.84 ppm assigned to the $*B2$ sites, accounting for the number of reporting sites per comonomer:

$B=I_{*B2}$

When characteristic signals resulting from consecutive 1-butene incorporation i.e. EBBE comonomer sequences are observed, such consecutive 1-butene incorporation is quantified using the integral of the signal at 39.4 ppm assigned to the ααB2B2 sites accounting for the number of reporting sites per comonomer:

$BB=2*I_{\alpha\alpha B2B2}$

When characteristic signals resulting from non consecutive 1-butene incorporation i.e. EBEBE comonomer sequences are also observed, such non-consecutive 1-butene incorporation is quantified using the integral of the signal at 24.7 ppm assigned to the ββB2B2 sites accounting for the number of reporting sites per comonomer:

$BEB=2*I_{\beta\beta B2B2}$

Due to the overlap of the *B2 and *ββB2B2 sites of isolated (EEBEE) and non-consecutively incorporated (EBEBE) 1-butene respectively the total amount of isolated 1-butene incorporation is corrected based on the amount of non-consecutive 1-butene present:

$B=I_{*B2}-2*I_{\beta\beta B2B2}$

With no other signals indicative of other comonomer sequences, i.e. butene chain initiation, observed the total 1-butene comonomer content is calculated based solely on the amount of isolated (EEBEE), consecutive (EBBE) and non-consecutive (EBEBE) 1-butene comonomer sequences:

$B_{total}=B+BB+BEB$

Characteristic signals resulting from saturated end-groups are observed. The content of such saturated end-groups is quantified using the average of the integral of the signals at 22.84 and 32.23 ppm assigned to the 2 s and 3 s sites respectively:

$S=(½)*(I_{2S}+I_{3S})$

The relative content of ethylene is quantified using the integral of the bulk methylene (δ+) signals at 30.00 ppm:

$E=(½)*I_{\delta+}$

The total ethylene comonomer content is calculated based the bulk methylene signals and accounting for ethylene units present in other observed comonomer sequences or end-groups:

$E_{total}=E+(5/2)*B+(7/2)*BB+(9/2)*BEB+(3/2)*S$

The total mole fraction of 1-butene in the polymer is then calculated as:

$fB=(B_{total})/(E_{total}+B_{total})$

The total comonomer incorporation of 1-butene in mole percent is calculated from the mole fraction in the usual manner:

$B[mol \%]=100*fB$

The total comonomer incorporation of 1-butene in weight percent is calculated from the mole fraction in the standard manner:

$B [wt \%]=100*(fB*56.11)/((fB*56.11)+((1-fB)*28.05))$

Mw, Mn

Molecular weight averages (Mw and Mn), Molecular weight distribution (MWD) and its broadness, described by polydispersity index, PDI=Mw/Mn (wherein Mn is the number average molecular weight and Mw is the weight average molecular weight) are determined by Gel Permeation Chromatography (GPC) according to ISO 16014-1:2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i/M_i)} \quad (1)$$

$$M_w = \frac{\sum_{i=1}^{N} (A_i \times M_i)}{\sum_{i=1}^{N} A_i} \quad (2)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3× Agilent-PLgel Olexis and 1× Agilent-PLgel Olexis Guard columns is used. As the solvent and mobile phase 1,2,4-trichlorobenzene (TCB) stabilized with 250 mg/L 2,6-Di tert butyl-4-methylphenol) is used. The chromatographic system is operated at 160° C. and at a constant flow rate of 1 mL/min. 200 μL of sample solution is injected per analysis. Data collection is performed using either Agilent Cirrus software version 3.3 or PolymerChar GPC-IR control software.

The column set is calibrated using universal calibration (according to ISO 16014-2:2003) with 19 narrow MWD polystyrene (PS) standards in the range of 0.5 kg/mol to 11 500 kg/mol. The PS standards are dissolved at room temperature over several hours. The conversion of the polystyrene peak molecular weight to polyolefin molecular weights is accomplished by using the Mark Houwink equation and the following Mark Houwink constants:

$$K_{PS}=19\times 10^{-3} \text{ mL/g}, \alpha_{PS}=0.655$$

$$K_{PE}=39\times 10^{-3} \text{ mL/g}, \alpha_{PE}=0.725$$

$$K_{PP}=19\times 10^{-3} \text{ mL/g}, \alpha_{PP}=0.725$$

A third order polynomial fit is used to fit the calibration data.

All samples are prepared in the concentration range of 0.5-1 mg/ml and dissolved at 160° C. for 2.5 hours for PP or 3 hours for PE under continuous gentle shaking.

As it is known in the art, the weight average molecular weight of a blend can be calculated if the molecular weights of its components are known according to:

$$Mw_b = \sum_i w_i \cdot Mw_i$$

where $Mw_b$ is the weight average molecular weight of the blend, $w_i$ is the weight fraction of component "i" in the blend and $Mw_i$ is the weight average molecular weight of the component "i".

The number average molecular weight can be calculated using the mixing rule:

$$\frac{1}{Mn_b} = \sum_i \frac{w_i}{Mn_i}$$

where $Mn_b$ is the number average molecular weight of the blend, $w_i$ is the weight fraction of component "i" in the blend and $Mn_i$ is the number average molecular weight of the component "i".

Flexural Modulus

The flexural test is carried out according to the method of ISO 178 by using compression molded test specimens produced according to EN ISO 1872-2. Flexural modulus is determined at a cross-head speed of 2 mm/min.

Tensile Strength and Tensile Strain

Tensile test is measured according to ISO 527. Crosshead speed for testing the tensile strength and elongations is 50 mm/min. Test specimen produced as described in EN ISO 1872-2, specimen type: 5A to ISO 527-2 are used.

Shore D

Shore D (1 s) is determined according to ISO868 on moulded specimen with a thickness of 4 mm. The shore hardness is determined after 1 sec after the pressure foot is in firm contact with the test specimen. The specimen is moulded according to EN ISO 1872-2.

Cable Extrusion

The cable extrusion is done on a Nokia-Maillefer cable line. The extruder has five temperature zones with temperatures of 170/175/180/190/190° C. and the extruder head has three zones with temperatures of 210/210/210° C. The extruder screw is a barrier screw of the design Elise. The die is a semi-tube on type with 5.9 mm diameter and the outer diameter of the cable is 5 mm. The compound is extruded on a 3 mm in diameter, solid aluminum conductor to investigate the extrusion properties. Line speed is 75 m/min. The pressure at the screen and the current consumption of the extruder is recorded for each material.

Cable Shrinkage

The shrinkage of the composition is determined with the cable samples obtained from the cable extrusion. The cables are conditioned in the constant room at least 24 hours before the cutting of the samples. The conditions in the constant room are 23±2° C. and 50±5% humidity. Samples are cut to 400 mm at least 2 m away from the cable ends. They are further conditioned in the constant room for 24 hours after which they are place in an oven on a talcum bed at 100° C. for 24 hours. After removal of the sample from the oven they are allowed to cool down to room temperature and then measured. The shrinkage is calculated according to formula below:

$$[(L_{Before}-L_{After})/L_{Before}]\times 100\%, \text{ wherein } L \text{ is length.}$$

Examples

Comparative example 1 (CE1) is the commercial products Borstar® HE6067. It is prepared using the catalyst (I) (Lynx 200), which is a commercially available Ziegler-Natta catalyst manufactured and supplied by BASF.

Comparative example 2 (CE2) is prepared according to the same process steps described in connection to comparative examples 3 and 4 (CE3-CE4) and inventive examples (IE1-IE5) with the only exception that catalyst (I) is used instead of catalyst (II).

Catalyst (II)

The catalyst, referred as catalyst (II), is described in WO2016/097193 and it is prepared according to the following steps:

Preparation of Pre-Treated Support Material

A jacketed 160 dm³ stainless steel reactor equipped with a helical mixing element is pressurized with $N_2$ to 2.0 barg and depressurized down to 0.2 barg until the $O_2$ level is less than 3 ppm. The vessel is then charged with heptane (20.5 kg) and 2,2-di(tetrahydrofuryl)propane (0.512 kg; 2.81 mol; DTHFP). The obtained mixture is stirred for 20 min at 40 rpm. The $MgCl_2$*3EtOH carrier (6.5 kg; DTHFP/Mg=0.1 mol/mol; 27.5 mol of Mg; Mg 10.18 wt-%, d10=9.5 μm, d50=17.3 μm and d90=28.5 μm, granular shaped) is added to the reactor with stirring. This suspension is cooled to approximately −20° C. and the 33 wt % solution of triethylaluminum (29.4 kg, 84.3 mol of Al; Al/EtOH=1.0 mol/mol) in heptane is added in aliquots during 2.5 h time while keeping the temperature below 10° C. After the TEA addition, the reaction mixture is gradually heated to 80° C. over a period of 2.4 h and kept at this temperature for additional 20 min at 40 rpm. The suspension is allowed to settle for 10 min, and the mother liquor is removed through a 10 μm filter net in the bottom of the reactor during 15 min. The vessel is charged with warm toluene (43 kg) and then stirred at 40 rpm for 38 min at 55-70° C. The suspension is allowed to settle for 10 min at 50-55° C. and the liquid removed through a 10 μm filter net in the bottom of the reactor during 15 min.

Catalyst Preparation

The vessel containing the pre-treated support material is charged with toluene (43 kg) and then cooled to approximately 30° C. Neat $TiCl_4$ (5.17 kg, 27.5 mol; Ti/Mg=1.0 mol/mol) is added. The obtained suspension is heated to approximately 90° C. over a period of 2 h and kept at this temperature for additional 1 h with stirring at 40 rpm. The suspension is allowed to settle for 10 min at approximately 90° C. and the mother liquor is removed through a 10 μm filter net in the bottom of the reactor during 15 min. The obtained solid material is washed twice with toluene (43 kg each) at ≈90° C. and once with heptane (34 kg) at ~40° C. All three of these washing steps use the same sequence of events: addition of preheated (90 or 40° C.) solvent, then stirring at 40 rpm for 30 min, allowing the solid to settle for 10 min, and then removal of liquid through a 10 μm filter net in the bottom of the reactor during 15 min.

The obtained catalyst is mixed with 20 kg of white oil and dried 4 h at 40-50° C. with nitrogen flow (2 kg/h) and vacuum (−1 barg). The catalyst is taken out from the reactor and reactor is flushed with another 20 kg of oil and taken out to the same drum. The dry catalyst yield is 3.60 kg (82.2% based on Mg).

Polymerization

In a polymerization plant consisting of a pre-polymerization reactor, two loop reactors connected in series to a gas-phase reactor and involving using one of the catalyst as specified above, bimodal ethylene copolymers for comparative examples CE2-CE4, and inventive examples 1E1-1E5 are obtained as follows:

Pre-Polymerization (A1)

The main purpose of the pre-polymerization reactor is to ensure good morphology of the final product. In the pre-polymerization reactor the catalyst is coated with a polymer which prevents the catalyst particle from breaking into smaller pieces when it enters the loop reactor. This minimizes the fines in the final product and ensures good morphology. It can also be used to moderate catalyst activity and optimize product properties.

First Loop Reactor (A21)

In this reactor, a part of the ethylene homopolymer is produced by the polymerization of ethylene in the presence of hydrogen. Molar ratio of hydrogen to ethylene catalyst type and further process conditions are provided in Table 1 for the comparative examples and in Table 3 for the inventive examples. In the first loop reactor no copolymer is fed to the reactor. The minor copolymer amount which is indicated in the tables remains from the pre-polymerization.

Resulting ethylene homopolymers $MFR_2$ values (A21 $MFR_2$) are also provided in Table 1 and 3.

Second Loop Reactor (A2)

In this reactor, more ethylene homopolymer is produced by the polymerization of ethylene in the presence of hydrogen. Process conditions are provided in the Table 1 and 3. In the second loop reactor no copolymer is fed to the reaction. The minor copolymer amount which is indicated in the tables remains from the pre-polymerization.

Resulting ethylene homopolymer $MFR_2$ values (A2 $MFR_2$) are also provided in Table 1 and 3.

Gas-Phase Reactor (A3)

In this reactor, ethylene copolymers are produced by the polymerization of ethylene and 1-butene which is actively added to the reactor. Process conditions are provided in the Table 1 and 3 as well as the weight ratio between the homopolymer and the copolymer. The resulting copolymer of ethylene and 1-butene is present in the form of an intimate mixture with the ethylene homopolymer from the loop reactors. Resulting ethylene copolymer density, $MFR_2$, $MFR_5$ values (A3 mixer density, $MFR_2$ and $MFR_5$) are provided in Table 1 and 3.

Compounding

The polymer mixture is then compounded with carbon black, two antioxidants and one acid scavenger.

Carbon black is provided in the form of a master-batch, CB MB, which is a composition consisting of 60.39% of HDPE, 0.11% of pentaerythrityl-tetrakis(3-(3',5'-di-t-butyl-4-hydroxyphenyl)-propionate (antioxidant) and 39.5% carbon black. Antioxidant 1 is pentaerythrityl-tetrakis(3-(3',5'-di-t-butyl-4-hydroxyphenyl)-propionate. Antioxidant 2 is tris(2,4-di-t-butylphenyl)phosphate. The acid scavenger is calcium stearate.

The amount of each component, which is provided in Table 1 and 3, is expressed in wt % of the entire composition.

The polymer particles are mixed with additives and extruded to pellets as it is known in the art. Preferably a counter-rotating twin screw extruder is used for the extrusion step. Such extruders are manufactured, for instance, by Kobe and Japan Steel Works. A suitable example of such extruders is disclosed in EP-A-1600276. Typically the specific energy input (SEI) is during the extrusion within the range of from 100 to 200 kWh/ton.

Results

Table 2 and 4 show many properties featured by the comparative and inventive compositions or by the corresponding cables. From comparing the results, it is apparent that the cable jacket compositions of the invention exhibit improved properties as regards shrinkage, in combination with excellent mechanical properties. Also the processability of the cable jacket compositions of the invention, which can be deduced from the values of $MFR_2$, $MFR_5$, Eta300, cable extrusion pressure and current values, is improved.

In particular, the compositions of the present inventions have better processability and reduced shrinkage than the marketed product Borstar® HE6067 (CE1). Mechanical properties are maintained at comparable levels.

TABLE 1

|  |  | CE1 - HE6067 | CE2 | CE3 | CE4 |
|---|---|---|---|---|---|
| Catalyst |  | (I) | (I) | (II) | (II) |
| A1 split | % |  | 2.0 | 2.7 | 3.0 |
| A1 C4 feed | g/h |  | 50.7 | 49.9 | 50.0 |
| A1 H2 feed | g/h |  | 1 | 10 | 10 |
| Catalyst feed | g/h |  | 2.2 | 12.5 | 11.2 |
| Cocatalyst feed | g/h |  | 5 | 24.0 | 24.5 |
| A21 H2/C2 | mol/kmol |  | 857.9 | 724.0 | 542.6 |
| A21 C4/C2 | mol/kmol |  |  | 6.2 | 5.6 |
| A21 split | % |  | 9.4 | 13.1 | 22.7 |
| A21 MFR2 | g/10 min |  | 308.0 | 133.0 | 184.0 |
| A2 H2/C2 | mol/kmol |  | 693.5 | 614.1 | 521.2 |
| A2 C4/C2 | mol/kmol |  |  | 4.3 | 1.8 |
| A2 split | % |  | 33.5 | 26.6 | 32.9 |
| A2 MFR2 | g/10 min |  | 314.0 | 344.0 | 256.0 |
| A3 H2/C2 | mol/kmol |  | 161.8 | 209.7 | 62.8 |
| A3 C4/C2 | mol/kmol |  | 213.0 | 219.5 | 412.3 |
| A3 split | % | 56.5 | 56.1 | 57.5 | 41.4 |
| A3 mixer density | kg/m³ | 942 | 943.7 | 943.1 | 942.4 |
| A3 mixer MFR2 | g/10 min | 1.6 | 1.57 | 1.87 | 1.18 |
| A3 mixer MFR5 | g/10 min |  | 5.94 | 6.08 | 4.87 |
| Antioxidant 1 | wt % | 0.15 | 0.15 | 0.15 | 0.15 |
| Antioxidant 2 | wt % | 0.15 | 0.15 | 0.15 | 0.15 |
| Acid scavenger | wt % | 0.1 | 0.1 | 0.1 | 0.1 |
| CB MB | wt % | 6.6 | 6.6 | 6.6 | 6.6 |
| Composition density | kg/m³ | 954 | 952.7 | 959.7 | 958.4 |
| Composition MFR2 | g/10 min | 1.7 | 1.56 | 1.73 | 1.19 |

TABLE 2

|  |  | CE1 - HE6067 | CE2 | CE3 | CE4 |
|---|---|---|---|---|---|
| Eta 300 | Pa · s | 522 | 543 | 621 | 525 |
| Mn |  | 7665 | 8195 | 9060 | 7710 |
| Mw |  | 112500 | 120000 | 97900 | 114000 |
| MWD |  | 14.72 | 14.64 | 10.80 | 14.83 |
| NMR C4 | mol % | 1.66 | 1.72 | 1.60 | 2.24 |
| Tensile strain at break | % | 918 | n.a. | 944 | 758 |
| Tensile stress at break | MPa | 28.4 | n.a. | 32.5 | 29.2 |
| Shrinkage | % | 1.05 | 0.88 | 1.01 | 0.98 |
| Shore D (1 s) |  | 62.2 | 59.8 | 59.8 | 58.8 |
| ESCR | h | 5000+ | n.a. | 5000+ | 5000+ |
| CB (measured) | wt % | n.a. | 2.36 | 2.33 | 2.82 |
| Flexural modulus | MPa | 900 | n.a. | 979 | 870 |
| Cable extrusion pressure at screen | bar | 161 | 172 | 173 | 145 |
| Cable extrusion current consumption | amp | 54 | 52 | 58 | 49 | n.a. = not available

TABLE 3

|  |  | IE1 | IE2 | IE3 | IE4 | IE5 |
|---|---|---|---|---|---|---|
| Catalyst |  | (II) | (II) | (II) | (II) | (II) |
| A1 split | % | 2.7 | 2.5 | 2.8 | 3.0 | 3.0 |
| A1 C4 feed | g/h | 14.0 | 50.0 | 1.9 | 50.0 | 50.0 |
| A1 H2 feed | g/h | 10 | 10 | 10 | 10 | 10 |
| Catalyst feed | g/h | 13.1 | 12.0 | 12.0 | 12.0 | 10.4 |
| Cocatalyst feed | g/h | 25.0 | 31.0 | 31.0 | 24.5 | 23.0 |
| A21 H2/C2 | mol/kmol | 795.6 | 536.0 | 562.3 | 674.2 | 201.8 |
| A21 C4/C2 | mol/kmol | 1.2 | 5.9 | 0 | 5.5 | 6.4 |
| A21 split | % | 13.3 | 16.6 | 19.3 | 22.8 | 22.8 |
| A21 MFR2 | g/10 min | 147.0 | 192.0 | 144.0 | 180.0 | 25.0 |
| A2 H2/C2 | mol/kmol | 676.6 | 457.2 | 536.4 | 545.0 | 292.7 |
| A2 C4/C2 | mol/kmol | 0 | 2.7 | 0 | 1.9 | 0.7 |
| A2 split | % | 27.1 | 24.7 | 28.9 | 33.1 | 33.4 |
| A2 MFR2 | g/10 min | 332.0 | 224.0 | 224.0 | 340.0 | 49.0 |
| A3 H2/C2 | mol/kmol | 297.1 | 281.4 | 144.8 | 151.0 | 142.7 |
| A3 C4/C2 | mol/kmol | 301.2 | 293.5 | 338.8 | 422.0 | 419.3 |
| A3 split | % | 56.9 | 56.3 | 49.0 | 41.0 | 40.8 |
| A3 mixer density | kg/m³ | 944.1 | 946.1 | 942.0 | 943.6 | 939.1 |
| A3 mixer MFR2 | g/10 min | 6.89 | 6.12 | 2.88 | 6.56 | 3.62 |
| A3 mixer MFR5 | g/10 min | 22.40 | 20.20 | 9.96 | 23.00 | 12.30 |
| Antioxidant 1 | wt % | 0.15 | 0.15 | 0.15 | 0.15 | 0.15 |
| Antioxidant 2 | wt % | 0.15 | 0.15 | 0.15 | 0.15 | 0.15 |
| Acid scavenger | wt % | 0.1 | 0.1 | 0.1 | 0.1 | 0.1 |
| CB MB | wt % | 6.6 | 6.6 | 6.6 | 6.6 | 6.6 |
| Composition density | kg/m³ | 957.5 | 955.6 | 955.8 | 958.9 | 953.9 |
| Composition MFR2 | g/10 min | 7.14 | 6.28 | 2.80 | 6.29 | 3.55 |

TABLE 4

|  |  | IE1 | IE2 | IE3 | IE4 | IE5 |
|---|---|---|---|---|---|---|
| Eta 300 | Pa · s | 359 | 386 | 477 | 311 | 471 |
| Mn |  | 8290 | 8900 | 8275 | 7305 | 10150 |
| Mw |  | 70800 | 73100 | 90850 | 75000 | 83600 |
| MWD |  | 8.54 | 8.22 | 10.98 | 10.26 | 8.22 |
| NMR C4 | mol % | 2.09 | 2.08 | 2.10 | 2.32 | 2.68 |
| Tensile strain at break | % | 999 | 1006 | 890 | 747 | 967 |
| Tensile stress at break | Mpa | 24.67 | 24.91 | 27.91 | 19.33 | 24.78 |
| Shrinkage | % | 0.45 | 0.47 | 0.53 | 0.45 | 0.44 |
| Shore D (1 s) |  | 59.3 | 58.6 | 54.3 | 58.5 | 56.1 |
| ESCR | h | 5000+ | 5000+ | 5000+ | 5000+ | 5000+ |
| CB (measured) | wt % | 2.96 | 2.27 | 2.30 | 2.95 | 2.78 |

TABLE 4-continued

| | | IE1 | IE2 | IE3 | IE4 | IE5 |
|---|---|---|---|---|---|---|
| Flexural modulus | MPa | 943 | 926 | 935 | 1008 | 807 |
| Cable extrusion pressure at screen | bar | 113 | 121 | 140 | 101 | 144 |
| Cable extrusion current consumption | amp | 44 | 45 | 47 | 40 | 50 |

The invention claimed is:

1. A cable jacket composition comprising a multimodal olefin copolymer, wherein the multimodal olefin copolymer has density of 0.935-0.960 g/cm$^3$ measured according to ISO 1183-1:2004 on compression molded specimen prepared according to EN ISO 1872-2; MFR$_2$ of 2.2-10.0 g/10 min measured according to ISO 1133-1 at 190° C., and a molecular weight distribution of 7 to 12, determined by gel permeation chromatography according to ISO 16014-1:2003, ISO 16014-2:2003, ISO 16014-4:2003 and ASTM D 6474-12 and the composition has ESCR of at least 2000 hours measured according to IEC 60811-406, method B and cable shrinkage of 0.70% or lower, wherein the multimodal olefin copolymer is produced in two or more reactors; and
wherein the polymerization of the multimodal olefin copolymer comprises two successive main polymerization stages in the presence of a MgCl$_2$ supported catalyst prepared according to a method comprising the steps of
a) providing solid carrier particles of MgCl$_2$*m OH adduct;
b) pre-treating the solid carrier particles of step a) with a compound of Group 13 metal;
c) treating the pre-treated solid carried particles of step b) with a transition metal compound of Group 4 to 6;
d) recovering the solid catalyst component; wherein the solid carrier particles are contacted with an internal organic compound of formula (I) or isomers or mixtures therefrom before treating the solid carrier particles in step c)

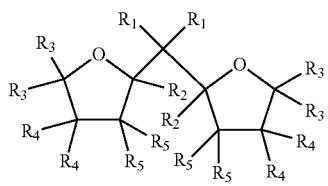

Formula (I)

and wherein in the formula (I), R$_1$ to R$_5$ are the same or different and can be hydrogen, a linear or branched C$_1$ to C$_8$-alkyl group, or a C$_3$-C$_8$-alkylene group, or two or more of R$_1$ to R$_5$ can form a ring, the two oxygen-containing rings are individually saturated or partially unsaturated or unsaturated, and R in the adduct MgCl$_2$*mROH is a linear or branched alkyl group with 1 to 12 C atoms, and m is 0 to 6; and
wherein the multimodal olefin copolymer comprises 43.1 wt % to 59.2 wt % of a low molecular weight fraction and 40.8 wt % to 56.9 wt % of a high molecular weight fraction.

2. The composition of claim 1, wherein the multimodal olefin copolymer has MFR$_2$ of 2.5-8.0 g/10 min measured according to ISO 1133-1 at 190° C.

3. The composition of claim 1, wherein the multimodal olefin copolymer has Mw of 55000-95000 g/mol.

4. The composition of claim 1, wherein the composition has a cable extrusion pressure of 144 bar or lower.

5. The composition according to claim 1, wherein the composition has Eta 300 of 500 Pa·s or lower.

6. The composition according to claim 1, wherein the multimodal olefin copolymer is a bimodal polymer mixture of the low molecular weight fraction, wherein the low molecular weight fraction comprises an ethylene homo- or copolymer; and the high molecular weight fraction, wherein the high molecular weight fraction is a copolymer of ethylene and a comonomer selected from the list consisting of 1-butene, 4-methyl-1-pentene, 1-hexene or 1-octene.

7. The composition according to claim 6, wherein the high molecular weight fraction comprises a copolymer of ethylene and 1-butene.

8. The composition according to claim 1 further comprising a conductive filler in an amount of 0.05 to 5 wt % of the entire composition.

9. The composition according to claim 1 essentially consisting of the multimodal olefin copolymer.

10. The composition according to claim 1, wherein the two main polymerization stages are a combination of loop reactor/gas phase reactor or gas phase reactor/gas phase reactor.

11. The composition according to claim 1, wherein the method further includes a pre-polymerization stage.

12. A cable comprising the composition of claim 1 said cable having shrinkage of 0.70% or lower.

13. A cable according to claim 12, which is a fiber-optic cable.

14. The composition according to claim 1 further comprising a conductive filler in an amount of 0.05 to 3 wt % of the entire composition.

15. A process for preparing a multimodal olefin copolymer, wherein the multimodal olefin copolymer has density of 0.935-0.960 g/cm$^3$ measured according to ISO 1183-1:2004 on compression molded specimen prepared according to EN ISO 1872-2; MFR$_2$ of 2.2-10.0 g/10 min measured according to ISO 1133-1 at 190° C., and a molecular weight distribution of 7 to 12, determined by gel permeation chromatography according to ISO 16014-1:2003, ISO 16014-2:2003, ISO 16014-4:2003 and ASTM D 6474-12 and the composition has ESCR of at least 2000 hours measured according to IEC 60811-406, method B and cable shrinkage of 0.70% or lower;
wherein polymerization of the multimodal olefin copolymer comprises two main polymerization stages in the presence of a MgCl$_2$ supported catalyst prepared according to a method comprising the steps of a) providing solid carrier particles of MgCl$_2$*m OH adduct; b) pre-treating the solid carrier particles of step a) with a compound of Group 13 metal; c) treating the pre-treated solid carried particles of step b) with a transition metal compound of Group 4 to 6; d) recovering the solid catalyst component; wherein the solid carrier particles are contacted with an internal organic compound of formula (I) or isomers or mixtures therefrom before treating the solid carrier particles in step c)

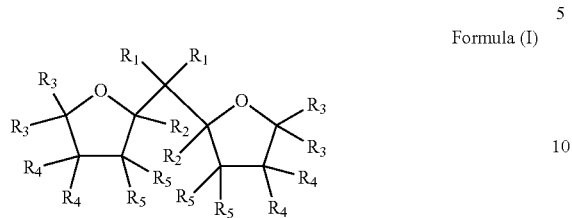

Formula (I)

and wherein in the formula (I), $R_1$ to $R_5$ are the same or different and can be hydrogen, a linear or branched $C_1$ to $C_8$-alkyl group, or a $C_3$-$C_8$-alkylene group, or two or more of $R_1$ to $R_5$ can form a ring, the two oxygen-containing rings are individually saturated or partially unsaturated or unsaturated, and R in the adduct $MgCl_2*mROH$ is a linear or branched alkyl group with 1 to 12 C atoms, and m is 0 to 6.

16. The process according to claim 15, wherein the two main polymerization stages are a combination of loop reactor/gas phase reactor or gas phase reactor/gas phase reactor.

17. The process according to claim 15, which further includes a pre-polymerization stage.

* * * * *